United States Patent [19]

Browning

[11] Patent Number: 4,841,114

[45] Date of Patent: Jun. 20, 1989

[54] HIGH-VELOCITY CONTROLLED-TEMPERATURE PLASMA SPRAY METHOD AND APPARATUS

[76] Inventor: James A. Browning, P.O. Box 6, Hanover, N.H. 03755

[21] Appl. No.: 193,702

[22] Filed: May 13, 1988

Related U.S. Application Data

[63] Continuation-in-part of Ser. No. 24,485, Mar. 11, 1987, Pat. No. 4,788,402.

[51] Int. Cl.[4] .......................... B23K 9/00; B23K 9/04

[52] U.S. Cl. .......................... 219/121.47; 219/76.16; 219/121.52; 219/121.59

[58] Field of Search ...................... 219/121.36, 121.48, 219/121.49, 121.5, 121.52, 121.59, 121.47, 74, 75, 76.16; 313/231.31, 231.41, 231.51; 428/34

[56] References Cited

U.S. PATENT DOCUMENTS

| | | | |
|---|---|---|---|
| 2,929,952 | 3/1960 | Giannini et al. | 219/121.52 |
| 3,097,292 | 7/1963 | Kugler et al. | 219/121.52 |
| 3,914,573 | 10/1975 | Muelhberger | 219/121.5 |
| 4,140,892 | 2/1979 | Muller | 219/121.5 |
| 4,311,897 | 1/1982 | Yerushalmy | 219/121.5 |
| 4,531,043 | 7/1985 | Zverina et al. | 219/121.5 |
| 4,570,048 | 2/1986 | Poole | 219/121.5 |

*Primary Examiner*—M. H. Paschall
*Attorney, Agent, or Firm*—Sughrue, Mion, Zinn, Macpeak, and Seas

[57] ABSTRACT

A surface discontinuity is formed along an anode nozzle bore sufficiently upstream of a nozzle exit orifice and of a sufficient size to cause an arc between an electrically conductive end wall of a plasma-arc torch anode nozzle passage and a coaxial cathode coaxially mounted by an opposite end wall of the torch cylindrical casing having a gas under pressure and at an established vortex flow to pass through the nozzle passage. A boundary layer of the vortex flow of gas along the anode bore wall provides a path for the arc to pass directly to the anode nozzle passage at or just downstream of the disturbance zone provided by the nozzle passage wall surface discontinuity. A counterbore may extend along a portion of the nozzle axis from the nozzle exit axially inwardly to form a radial shoulder with the main bore of the anode nozzle and define the discontinuity. Alternatively, a shallow annular groove may be machined into the anode nozzle bore, or an annular ring may project radially inwardly of the nozzle passage bore to constitute such alternative surface discontinuity. Material may be sprayed into a high velocity hot gas stream downstream of the arc column and its downstream ionized region to eliminate excessive heating of the particles sprayed by the torch. A reduced diameter nozzle bore section may be provided between the terminus of the arc column and/or its associated downstream ionized region and the point of the introduction of the material to be sprayed, with the reduced diameter nozzle bore forming a nozzle throat of an expansion nozzle producing a supersonic jet stream at the nozzle exit.

11 Claims, 2 Drawing Sheets

FIG.1 PRIOR ART
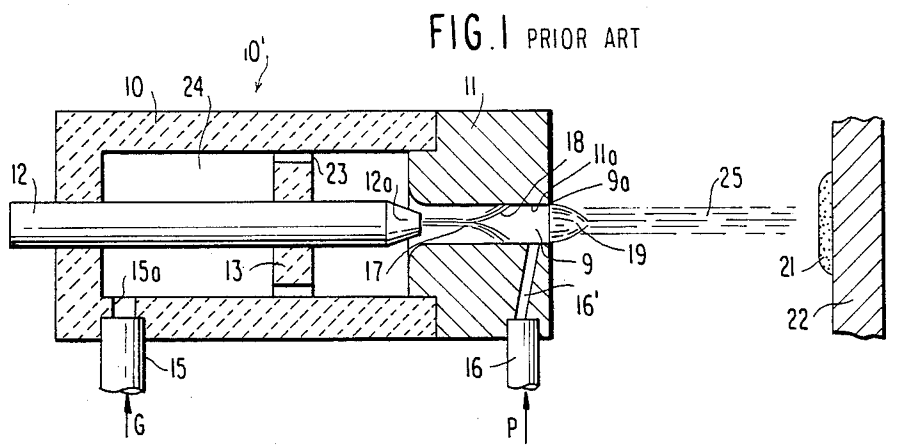
FIG.2
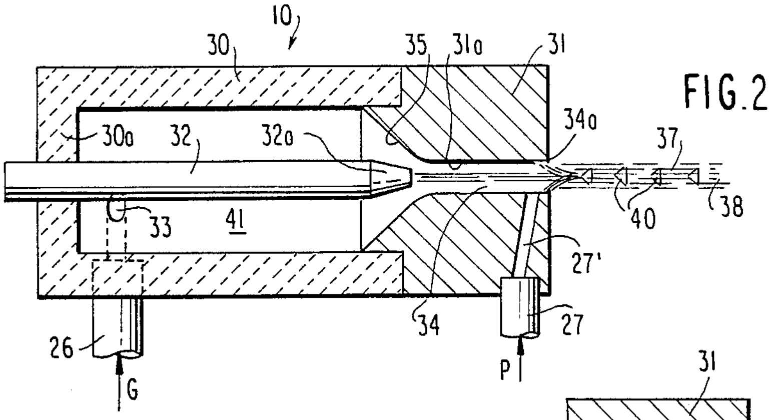
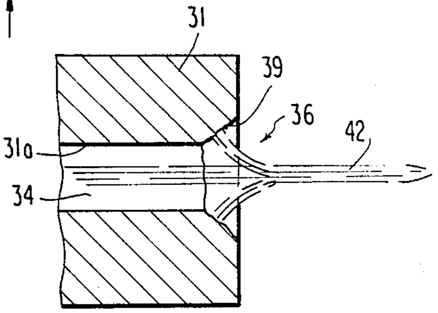
FIG.2a
FIG.3
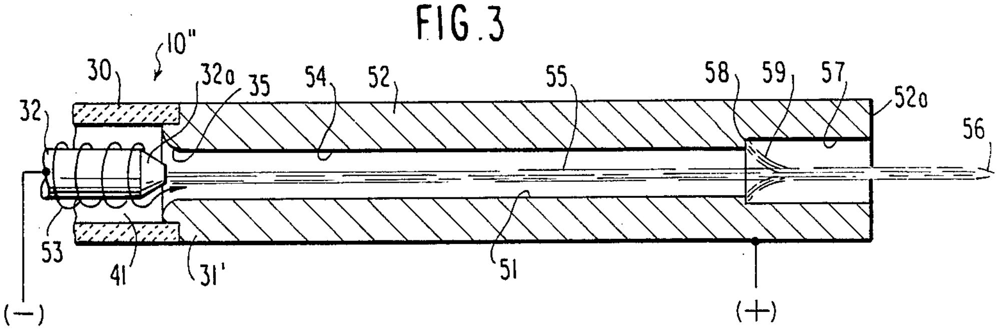

HIGH-VELOCITY CONTROLLED-TEMPERATURE PLASMA SPRAY METHOD AND APPARATUS

This invention is a continuation-in-part application of Application Ser. No. 024,485, filed Mar. 11, 1987, now U.S. Pat. No. 4,788,402 to the applicant and entitled "HIGH POWER EXTENDED ARC PLASMA SPRAY METHOD AND APPARATUS".

FIELD OF THE INVENTION

This invention relates to a plasma arc spray method and apparatus at significantly higher current and voltage over conventional plasma spray systems and more particularly, to a system which extends the life of the circumferential anode region at the end of the exit nozzle of plasma torches.

BACKGROUND OF THE INVENTION

In all current plasma spray systems using powder injection, the apparatus is such that the arc column itself or its ionized plume is used as the extremely high temperature heat source. This fact is of extreme importance in applicant's pending U.S. patent application Ser. No. 024,485, filed Mar. 11, 1987, by forcing the arc column to extend much further beyond the nozzle exit than in conventional plasma torches. In accordance with FIG. 1 of the drawings, a conventional plasma spray torch 10' is illustrated, in which the water cooling means have been purposely eliminated for simplicity purposes from that figure. An electrically insulating body piece 10 of cylindrical, cup-shaped form supports a cathode electrode 12 coaxially and projecting towards but spaced from a second body piece 11 closing off the open end of the cup-shaped form body piece 10, at the end opposite that supporting the cathode electrode 12. The second body piece 11 is provided with an axial bore **11*a* constituting the plasma spray torch nozzle passage 9. An arc 17 is formed by connecting an electrical potential difference across the cathode electrode 12 and the second body piece 11, acting as the anode. The arc 17 passes from the electrode 12 to the inner wall of the nozzle passage 9. Its length is extended by a flow of plasma forming gas as shown by the arrow G which enters the annular manifold 24 about the cathode electrode 12 through a gas supply tube 15. Tube 15 connects to the body piece, and through an aligned radial hole 15*a* within the side of that cylindrical body piece. A transverse partition 13 of insulating material, like that of body piece 10, supports the electrode 12. The partition 13 is provided with a number of small diameter passages 23 leading into the nozzle passage 9 with flow about the tapered tip end 12*a* of the cathode electrode 12. Powder to be sprayed, as indicated by the arrow P, passes into the arc-heated gases at a pint beyond the anode foot 18 of arc 17. Powder is introduced through the tube 16 and flows into a passage 16' aligned therewith and opening to the bore 11*a* in such a manner as to assure centering of the powder flow as best possible, along the hot gas jet 25 which exits from the end of nozzle 9**.

An extremely bright conical arc region 19 extends a short distance beyond the exit of the nozzle 9, with this region constituting the further extension of the ionized gas species. Tremendous heat transfer rates occur within the conical region 19. As may be appreciated, there is added gaseous heating of particle P flow beyond the ionized zone 19 within the hot gas jet 25. Further, the particles pick up speed in the high velocity (but subsonic) jet 25 to strike the surface of the workpiece 22 and to form the coating 21 on the surface of the workpiece. Exemplary, the conventional plasma spray torch 10' is provided with a flow of 100 SCFH of nitrogen gas G using a nozzle passage 9 bore diameter of 5/16-inch, and the torch is provided with an operating current of 750 amp and an arc voltage of 80 volts. The ionized zone or region 19 is observed to extend about ⅓-inch beyond the end **9*a*** of the nozzle. The gross power level reached is 60 Kw. The combined cathode and anode losses are about 30 volts with a net heating capability ($I^2R$ heating of the gas) of 37.5 Kw. Assuming an additional heat loss to the cooling water of 20%, the gas heating amounts to 30 Kw. The enthalpy increase of the plasma gas in such conventional system under the conventional operating parameters set forth above is about 14,500 Btu per pound.

In all current plasma equipment employing so-called low-voltage arcs (around 80 volts) the apparatus operates as shown in FIG. 1. Where the material to be sprayed is heat-insensitive, the high heating zone is of great benefit. However, for material which can be heat-damaged, such plasma systems have never been able to match the quality of the "D-GUN" or my prior high-velocity combustion system as set forth in U.S Pat. No. 4,416,421.

Prior plasma torches have relied on almost instantaneous particle heating as the powder passes into and through cone 19 of FIG. 1. Many of these particles (particularly smaller sizes) actually become fully molten, and perhaps even vaporized. A heat-sensitive material such as tungsten carbide (WC) decarbonizes to form $W_2C$ which may not be desirable. In addition, the molten particles may become heavily oxidized. The "D-GUN" and apparatus of U.S. Pat. No. 4,416,421 provide an extended high-velocity heat source of much reduced temperature compared to the nearly instantaneous heating of conventional plasma equipment. The entrained powder particles in such apparatus are heat-softened rather than being melted, thus retaining their chemical composition and becoming only lightly oxidized even when sprayed on to a workpiece held in the open atmosphere.

FIG. 2 is a longitudinal sectional view of an improved, non-transferred plasma arc torch having an extended arc in accordance with the principals of my copending parent U.S. application Ser. No. 024,485. FIG. **2*a* is an enlarged, longitudinal sectional view of the exit end of nozzle bore 31*a* of the plasma-arc torch of FIG. 2. Referring to FIGS. 2 and 2*a*, the improved plasma spray torch is indicated generally at 10 and employs a cylindrical, electrically insulating body piece 30 similar to that at 10' in the prior art plasma torch of FIG. 1. Body piece 30 is closed off by a second cylindrical body piece 31 and the opposite end of the body piece 10 includes a transverse end wall 30*a* supporting coaxially and projecting through annular chamber 41 internally of the body piece 30, a cathode electrode 32. The foot 32*a* of the cathode electrode 32 projects into a conical reducing section 35 of bore 31*a* defining a torch nozzle passage 34. A high vortex strength plasma gas flow creates an extended ionized arc column zone achieved by having a gas supply pipe or tube 26 tangentially disposed with respect to the annular chamber 41 surrounding the cathode electrode 32, with the gas flow as shown by arrow G entering chamber 41 tangentially as clearly seen in FIG. 2*b* through passage 33 and exiting through the conical reducing section 35 leading to bore 31***a.* As such, the conical reducing section 35 smoothly passes the vortex flow into the reduced diameter nozzle passage 34. The principle of conservation of angular momentum creates a greater vortex strength with reduction of the outer boundary diameter of the gas flow. A small diameter core of the vortex exhibits low gas pressure relative to that of the gas layers near the passage 34 wall (bore 31*a*). An extended arc column 37 results with that arc column positioned to pass through the low pressure core and well beyond the exit 34*a* of nozzle 34. By physical phenomena, not well understood by the applicant, a reduction of the nozzle 34 diameter and/or an increase in arc current creates a greater than critical pressure drop in its passage through the nozzle 34 to the atmosphere to eliminate the vagaries of the arc anode spot associated with the subsonic counterpart. With supersonic flow, the anode region becomes more diffused and spreads over the inner wall of nozzle 34 near the nozzle exit 34*a* and over a thin circumferential radial region of the body piece 31 surrounding the exit 34*a* of the nozzle. The extended arc 37 (ionized zone) is of reduced diameter compared to the ionized zone 19 of the prior art torch, FIG. 1. Its length extending beyond the nozzle exit 34*a* is also significantly increased over the length of the ionized zone 19 of the prior art device, FIG. 1. The torch 10 of FIGS. 2, 2*a*, for example, operates adequately using 120 SCFH of nitrogen under an applied voltage of 200 volts across the gap between the cathode electrode 32 and the anode 31 at a current of 400 amp. In such example, the nozzle diameter was 3/16-inch and under operating parameters, the ionized zone extends 1¼ inches beyond the nozzle exit 34*a*, with the electrode losses again about 30 volts, the net gas enthalpy (after the 20% cooling loss) reach 27,000 Btu per pound; nearly double that of the prior art apparatus of FIG. 1.

FIG. 2*a* illustrates, in an enlarged view, the extended arc 42 with its anode foot 36 at the exit of nozzle 34, and with the cavity 39 eroded into nozzle 31 by the coaction of the intense anode heating within the presence of atmospheric oxygen which is readily available. The formation of cavity 39 takes several hours of operation, and as it erodes deeper into the nozzle, the erosion rates become less. This lessening is probably due to exiting gas inhibiting oxygen flow into cavity. In any event, the cavity is unsightly and is best eliminated.

It is therefore a present object of the present invention to provide a method and apparatus for the extension of the life of circumferential anode region at the end of the exit nozzle of plasma torches of the type set forth in copending U.S. application Ser. No. 024,485.

SUMMARY OF THE INVENTION

The invention is an improvement in a plasma-arc torch having a cylindrical casing forming a chamber with a first, electrically conductive end wall including a bore defining an anode nozzle passage extending axially therethrough and forming an anode electrode and a second, opposite end wall. A cathode electrode is mounted coaxially within the opposite end wall of the cylindrical casing and being electrically insulated from the first end wall and terminates short thereof. The anode nozzle passage at its end facing the cathode electrode flares outwardly and is conically enlarged. Means are provided for introducing a plasma producing gas under pressure into the chamber defined by the cylindrical casing, the cathode electrode and the end walls. An electrical potential difference is created between the cathode electrode and the first end wall constituting the anode nozzle to create a plasma arc flame normally exiting from the anode nozzle passage, and with the anode foot normally constituted by a circumferential metal ring surrounding the nozzle exit orifice. The improvement resides in a surface discontinuity at a point along the nozzle bore sufficiently upstream of the nozzle exit orifice and of sufficient size to cause the arc to pass to the anode wall in the vicinity of the discontinuity, thereby establishing an arc column which, with a downstream ionized region, is maintained wholly within the extended anode bore, thereby extending the life of the circumferential anode region in the vicinity of the exit of the nozzle while yielding full control over arc-length characteristics.

Preferably, the plasma producing gas is fed tangentially into the end of the chamber remote from the anode nozzle passage, with the gas establishing a vortex flow exhibiting a low pressure core extending through the nozzle passage and with the core establishing a small diameter arc column extending partially through the nozzle passage, such that the boundary layer of the vortex flow of gas along the anode bore wall provides a path for the arc to pass directly to the anode nozzle passage wall at or just downstream of the disturbance zone provided by the nozzle passage wall surface discontinuity. The surface discontinuity may be formed by a counterbore extending along a portion of the nozzle axis from the nozzle exit axially inwardly and forming radial shoulder with the main bore of the anode nozzle. Alternatively, a shallow annular groove machined into the anode nozzle bore of sufficient depth and width functions to form the surface discontinuity. The anode nozzle passage may have a nozzle bore of reduced diameter over a short axial section, upstream from the nozzle exit and forming a radial shoulder with the nozzle bore facing upstream thereof to constitute said surface discontinuity. Preferably, means are provided for introducing a material to be sprayed into a high-velocity hot gas stream downstream of the arc column and its downstream ionized region to thereby eliminate excessive heating of the particles sprayed by the torch. Additionally, a reduced diameter nozzle bore section may be positioned between the terminus of the arc column and/or its associated downstream ionized region and the means for introducing the material to be sprayed, with the reduced diameter nozzle bore forming a nozzle throat of an expansion nozzle functioning to produce a supersonic jet stream at the nozzle exit.

BRIEF DESCRIPTION OF THE DRAWINGS

FIG. 1 is a longitudinal sectional view of a conventional plasma spray torch employed in spray coating of a substrate.

FIG. 2 is a longitudinal sectional view of a nontransferred plasma arc torch of copending parent application Ser. No. 024,485.

FIG. 2*a* is an enlarged longitudinal sectional view of the exit end portion of the plasma arc torch nozzle of FIG. 2.

FIG. 3 is a longitudinal sectional view of a nozzle exit portion of a nontransferred plasma arc torch forming a preferred embodiment of the present invention incorporating a counterbore within the exit end of the nozzle to control the anode foot location and thus, the overall voltage level of the plasma arc torch.

DESCRIPTION OF THE PREFERRED EMBODIMENTS

Figure 3C:
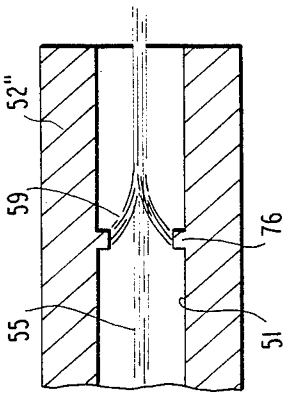
FIGS. 3*a*, 3*b* and 3*c* are sectional views of the nozzle exit portion as modified for the non-transferred plasma arc torch of FIG. 3 forming further embodiments of the invention.

Referring to FIG. 3, a plasma spray torch of the non-extended arc type is indicated generally at 10″ and is in most respects similar, if not identical, to that as shown in FIG. 2, and elements common thereto employ the same numerals. Thus, the cylindrical, electrically insulating body piece 30 is coupled to body piece 31′ to close off the end of annular chamber 41 at the tapered tip portion 32*a* of cathode electrode 32, where that cathode electrode tip portion or foot 32*a* projects into the conical reducing section 35 of bore 31′*a* defining the torch nozzle passage 54. The body piece 31′ is shown with a nozzle passage 54 which is considerably longer than nozzle passage 34 of applicant's earlier work FIG. 2. The embodiment of the invention of FIG. 3 is characterized by the presence of a counterbore 57 at the exit end 52*a* of nozzle anode 52 forming a radial shoulder or circumferential shelf 58 constituting an effective way to locate the anode ring 59 some distance from the exit end 52*a* of the anode nozzle 52. Similarly to applicant's prior work FIG. 2, the basic elements of the plasma torch are constituted by the cathode electrode 32, aligned with the nozzle bore 51. A whirling vortex gas flow 53 about the cathode electrode 32 passes into the conical reducing section 35 of the nozzle passage 54 defined by anode bore 51, thereby centering the arc column 55 along bore 51 so as to pass beyond the nozzle exit to some point downstream as at 56. The radial shoulder or circumferential shelf 58 defined by bore 51 and counterbore 57 is of relatively small width and at an axial position within the nozzle 52 which cannot be reached by diffusion of atmospheric oxygen. Applicant has determined that a counterbore diameter of only 1/10 larger than that of the nozzle bore diameter 51 is sufficient to locate the anode ring 59 as desired. A typical high-voltage operation places the anode ring 59 3¾ inches from the tip of the cathode, where the main nozzle bore 51 is 51/16 inches, the counterbore 57 is 11/32-inch. In the typical plasma arc torch, the gas G swirling through chamber 41 was nitrogen with an operating voltage of 400 volts for the torch.

By increasing the axial depth of the counterbore 57 from the exit end 52*a* of the anode nozzle 52 to the position indicated by dotted line plane A, the voltage may be reduced further and with an effective length of 5/16-inch bore of 1-inch, the voltage reduces to 100 volts.

Applicant has found it highly surprising that the provision of such a small surface area shelf or radial shoulder 58 yields full control over arc-length characteristics. It allows a unique plasma spray apparatus 10″ to operate effectively. The applicant concludes that a disturbance of the peripheral (boundary layer) flow along the anode wall (bore 51, counterbore 57) provides a path for the arc to pass directly to the wall at or just downstream of the disturbance zone, forming anode ring 59.

Figure 3B:
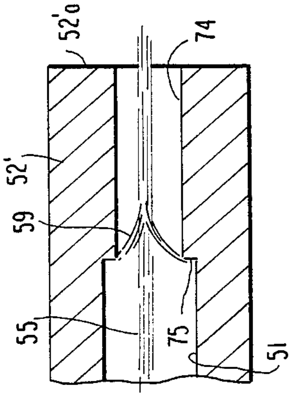
Figure 3A:
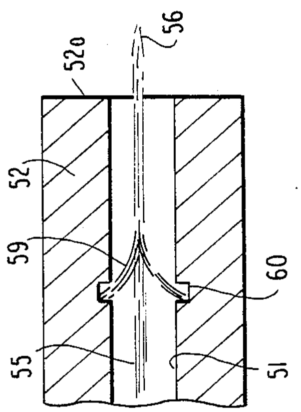

In a slight modification of the embodiment of FIG. 3, for an arc torch indicated essentially of the same construction as the FIG. 3 embodiment, in place of the counterbore 57, the FIG. 3*a* torch has a shallow annular groove 60 machined into the anode wall having an otherwise continuous bore 51 sized identically to that of the embodiment of FIG. 3.

Reference to FIG. 3*b* illustrates a further modification of the embodiment of FIG. 3. In this case, the nozzle anode 52′, while provided with a same bore 51 as in FIG. 3, at the nozzle exit end 52′*a*, there is provided a slight annular projection having a reduced diameter bore 74 forming a shoulder 75 facing upstream and constituting the surface discontinuity of the nozzle bore at a point along that bore and upstream of the nozzle exit at 52′*a*. Again, the arc column 55 with a downstream ionized region maintained wholly within the extended anode bore, thereby extending the life of the circumferential anode region in the vicinity of the nozzle exit of the plasma torch while yielding full control over arc-length characteristics.

Alternatively, in FIG. 3*c*, a shallow radially inwardly projecting ring 76 may be machined into the anode interior wall, the requirement being that a surface discontinuity be placed at a desired axial location along the uniformly whirling gas flow initiating within chamber 41 and passing through the nozzle bore 51, and that it be of sufficient size to cause the arc to pass to the anode 52″ at that location.

The new plasma operating mode provides an apparatus in which the powder may be introduced to the high-velocity gas stream downstream of the arc column 55 in similar fashion to the introduction of such powder into the arc column 37 of applicant's prior work FIG. 2, or to the ionized conical zone 19 of the prior art plasma arc torch of FIG. 1.

Figure 4:
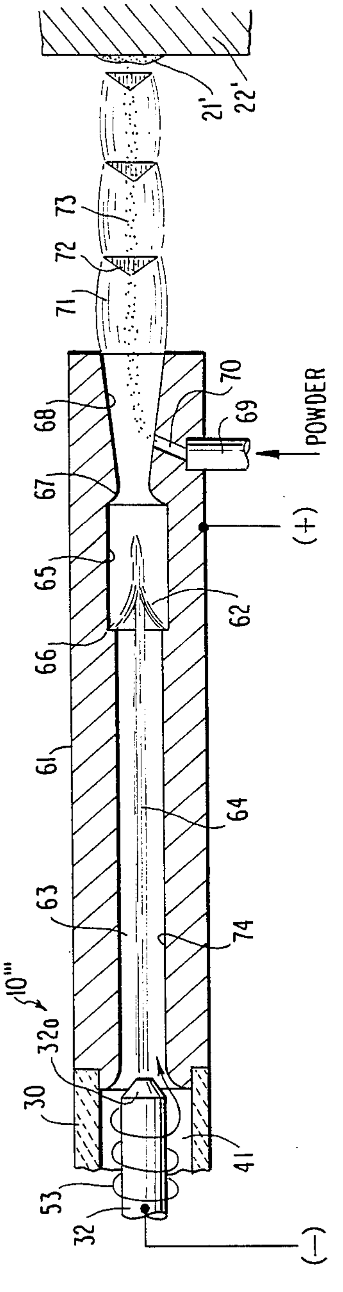
FIG. 4 is a longitudinal sectional view of a nontransferred plasma arc torch nozzle portion forming a further embodiment of the invention with an expansion nozzle downstream of a counterbore controlling the anode foot location internally within the nozzle, and to facilitate uniform high-velocity flow of plasma-heated gas to effect heat-softening of a powder being sprayed.

FIG. 4 is a longitudinal sectional view of a nontransferred plasma arc torch indicated generally at 10‴ amounting to a further modification of applicant's embodiment of FIG. 3, with the torch 10‴ including a similar cup-shaped body 30 coaxially mounting an anode nozzle 61 downstream of cathode electrode foot 32*a* which allows much lower heat input rates to the particles introduced to the discharge gas stream via tube 69 as indicated by the headed arrow labeled "powder" than currently possible using more conventional plasma equipment. Also, in the embodiment of FIG. 4, much higher exit jet velocities may be used to accelerate the heat-softened particles to extreme velocity. Again, the cathode electrode 32 is axially aligned with the anode nozzle passage 74, defined by bore 74 of anode nozzle or piece 61. A gas vortex flow is established in the manner of the FIG. 2 apparatus about the periphery of the cathode electrode 32 and within annular chamber 41. In this case, the counterbore 65 for a radial shoulder or anode shelf 66 to which the anode ring 62 attaches downstream of the terminal end of the arc column 64. Further, there is provided a throat 67 of reduced cross sectional area to maintain the upstream gas pressure at the desired elevated pressure. A diverging expansion nozzle 68 forms a supersonic jet stream 71 characterized by shock diamonds 72. The powder is introduced into the expanding gas stream by passing the powder through a radial tube 69 and an oblique hole 70 such that the powder material penetrates into the supersonic jet 71. It is important to note that the powder particles 73 are subject only to the hot sensible gas and perhaps, a small percentage of the dissociated gas forming the supersonic jet stream 71. Ionized specie are not present in sufficient number to maintain arc action or to form the brilliant cones usually associated with their presence. Where the ionized regions may reach temperatures in the range of 20,000° F., the more fully developed flow in accordance with the embodiments of the present invention are, perhaps, half that. Radiation dangers, particularly in the ultraviolet range are essentially eliminated. However, the jet temperatures are well above those available with internal combustion systems. Thus, entrained particles 73 are quickly brought to their fusion temperatures prior to deposit 21' on a substrate such as substrate 22, FIG. 1. By adjusting the relationships of gas enthalpy, jet velocity, and particle dwell distance prior to impact on a substrate in the path of the supersonic jet 71, it is possible to bring the particles 73 to their heat-softened condition for impact against the substrate 22' or other piece to be coated. In the embodiments of FIGS. 3 and 4, the negative and positive electrical connections are made from a source (otherwise not shown) to the cathode electrode 32 in both instances, and the anode electrode 52 of FIG. 3 and 61, FIG. 4, respectively.

While the invention has been shown and described in detail with reference to preferred embodiments thereof, it will be understood to those skilled in the art to which this invention pertains that various changes in the form and detail may be made therein without departing from the spirit and scope of the invention.

What is claimed is:

1. In a plasma-arc torch comprising a cylindrical casing forming a chamber and having a first, electrically conductive end wall including an extended length nozzle bore defining an anode nozzle passage extending axially therethrough and forming an anode electrode and a second, opposite end wall, a cathode electrode mounted coaxially within the opposite end wall of the cylindrical casing and being electrically insulated from said first end wall and terminating short thereof, said anode nozzle passage at its end facing said cathode electrode flaring outwardly and being conically enlarged, means for introducing a plasma producing gas under pressure into the chamber defined by said cylindrical casing, said cathode electrode and said end walls, and means for creating an electrical potential difference between said cathode electrode and said first end wall constituting said anode nozzle to create a plasma arc flame normally exiting from said anode nozzle passage, and with an anode foot normally constituted by a circumferential metal ring surrounding the nozzle exit orifice, the improvement comprising:

a surface discontinuity at a point along the nozzle bore, sufficiently upstream of said nozzle exit orifice and of sufficient size to cause the arc to pass to the anode nozzle passage wall in the vicinity of the discontinuity, thereby establishing an arc column which, with a downstream ionized region is maintained wholly within the extended length nozzle bore, thereby extending the life of the circumferential anode region, in the vicinity of the exit of the nozzle of the plasma torch while yielding full control over arc-length characteristics, wherein said means for introducing said plasma producing gas under pressure into said chamber comprises means for feeding said gas tangentially into the end of the chamber remote from said anode nozzle passage to establish a vortex flow of gas exhibiting a low pressure core extending through the anode nozzle passage and with said core establishing a small diameter arc column extending partially through said nozzle passage such that the boundary layer of the vortex flow of gas along the anode nozzle passage wall provides a path for the arc to pass directly to the anode nozzle passage wall at, or just downstream of the disturbance zone provided by the nozzle passage wall surface discontinuity, and further comprising means for introducing a material to be sprayed into a high-velocity, essentially ion-free hot gas stream downstream of the arc column and its downstream ionized region, at significantly lower temperature that of said arc column and its downstream ionized region, thereby eliminating excessive heating of the particles sprayed by the torch.

2. The plasma-arc torch as claimed in claim 1, wherein a counterbore extends along a portion of the nozzle axis from the nozzle exit axially inwardly and forms a radial shoulder with the main bore of the anode nozzle with the radial shoulder constituting said discontinuity.

3. The plasma-arc torch as claimed in claim 2, wherein the counterbore has a diameter which is less than 25% in excess of the diameter of the nozzle bore.

4. The plasma-arc torch as claimed in claim 2, wherein the counterbore has a diameter less than 40% in excess of the diameter of the nozzle bore, and wherein the axial position of the radial shoulder is chosen to define a predetermined desired arc voltage for the arc between the cathode electrode and the anode nozzle at the radial shoulder.

5. The plasma-arc torch as claimed in claim 1, wherein a shallow annular groove is machined into the anode nozzle bore of sufficient depth and width to form said surface discontinuity at an axial position sufficiently upstream of the anode nozzle passage exit to insure arc passage to the anode wall within the anode nozzle bore.

6. The plasma-arc torch as claimed in claim 1, wherein said anode nozzle passage has a nozzle bore of reduced diameter over a short axial section upstream from the nozzle exit and forming a radial shoulder with the nozzle bore facing upstream thereof and constituting said surface discontinuity.

7. The plasma-arc torch as claimed in claim 1, wherein said anode nozzle bore has a radially inwardly projecting ring over a short axial length, upstream from said nozzle exit and constituting said surface discontinuity.

8. The plasma-arc torch as claimed in claim 7, further comprising a reduced diameter nozzle bore section positioned between the terminus of the arc column and/or its associated downstream ionized region and said means for introducing the material to be sprayed, and wherein said reduced diameter nozzle bore section forms a nozzle throat of an expansion nozzle functioning to produce a supersonic jet stream at the nozzle exit.

9. In a method of operating a plasma-arc torch having a cylindrical casing and having a first, electrically conductive end wall including an extended length nozzle bore defining an anode nozzle passage extending axially therethrough and forming an anode electrode and a second, opposite end wall, a cathode electrode mounted coaxially within the opposite end wall of the cylindrical casing and being electrically insulated from said first end wall and terminating short thereof, said anode nozzle passage at its end facing said cathode electrode flaring outwardly and being conically enlarged, said method comprising the steps of:

introducing a plasma producing gas under pressure into said chamber and creating an electrical potential difference between the cathode electrode and said anode nozzle to create a plasma-arc flame normally exiting from said anode nozzle passage, the improvement comprising;

placing a discontinuity at a point along the extended length nozzle bore sufficiently upstream of said nozzle exit orifice and of sufficient size to cause one arc to pass to the anode nozzle passage wall in the vicinity of the discontinuity thereby establishing an arc column which, with downstream ionized region, is maintained wholly within the extended length nozzle bore, thereby extending the life of the circumferential anode region in the vicinity of the exit of the anode nozzle, while yielding full control over the arc-length characteristics, and introducing particles to be sprayed at a point within said plasma-arc flame downstream of said arc column with its downstream ionized region at an area of said plasma-arc flame in the form of a high velocity hot gas stream exhibiting no ionization with said particles accelerated to extreme velocity for impact against a workpiece surface to be coated, thereby eliminating excessive heating of the particles prior to impact.

10. The method as claimed in claim 9, wherein the position of the surface discontinuity is chosen to select the predetermined desired arc voltage between the anode and the cathode.

11. The method as claimed in claim 10, further comprising the steps of causing said high velocity hot gas stream exhibiting no ionization, to pass through a reduced diameter nozzle bore section downstream of the terminus of the arc column and/or its associated ionized region and upstream of the injection point of the particles to be sprayed and expanding the hot gas stream within an expanding nozzle bore portion downstream of said reduced diameter nozzle bore section forming a nozzle throat, to produce a supersonic jet stream exiting from the end of the extended length nozzle bore.

* * * * *